E. J. YOUNGBERG.
SEEDER.
APPLICATION FILED JAN. 13, 1913.
1,080,038.
Patented Dec. 2, 1913.
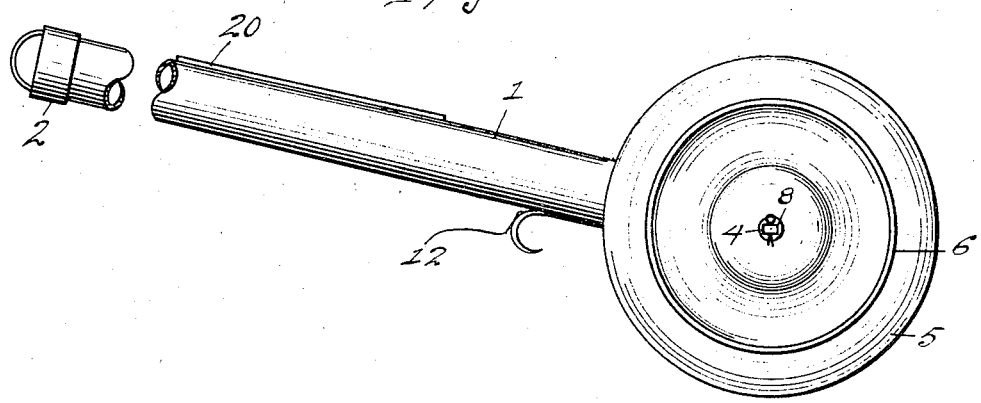
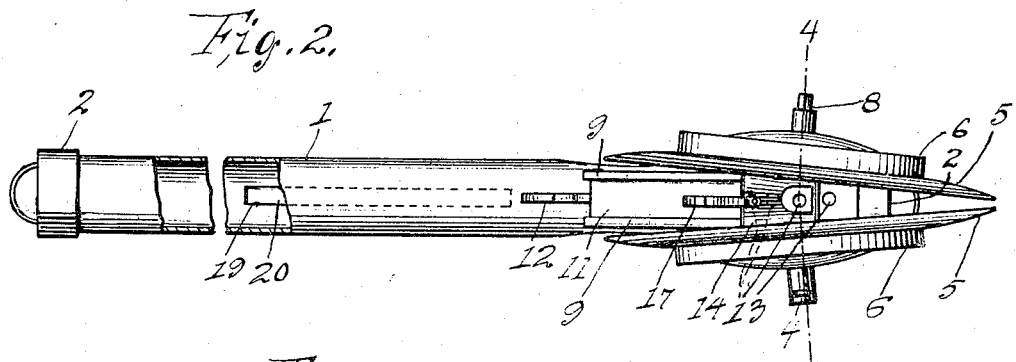
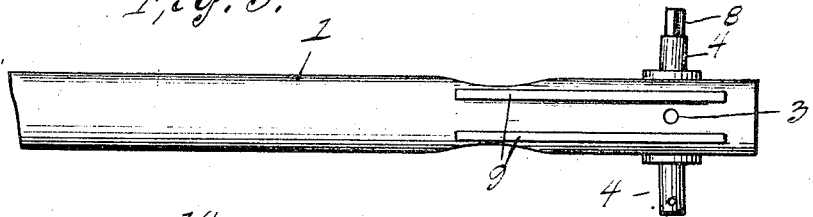
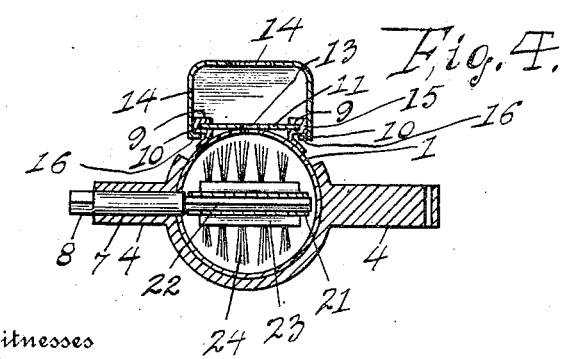
Witnesses
Robert M. Sutphen
A. I. Hurd
Inventor
E. J. Youngberg,
By Watson E. Coleman
Attorney

UNITED STATES PATENT OFFICE.

ELOF J. YOUNGBERG, OF CANON CITY, COLORADO.

SEEDER.

1,080,038. Specification of Letters Patent. Patented Dec. 2, 1913.

Application filed January 13, 1913. Serial No. 741,808.

*To all whom it may concern:*

Be it known that I, ELOF J. YOUNGBERG, a subject of Gustavus V of Sweden, residing at Canon City, in the county of Fremont and State of Colorado, have invented certain new and useful Improvements in Seeders, of which the following is a specification, reference being had to the accompanying drawings.

This invention relates to new and useful improvements in seeders and an object thereof is the provision of a seeder in which the quantity of seed deposited in the furrow may be quickly and easily regulated.

A further object of this invention is the provision of a seeder comprising a hollow handle forming a reservoir for the seed, the handle being provided on its forward end with a pair of furrow closing disks, the feeder being connected to one of said disks whereby the seed is only deposited in the furrow upon rotation of the disks.

A still further object of this invention is the provision of a seeder comprising a hollow reservoir handle, the handle being provided with a discharge opening in its under face near the lower end thereof and a discharge regulating plate slidably connected to said handle under the discharge opening, the plate being provided with a series of openings of different diameters whereby the amount of seed deposited in the furrow may be quickly and easily regulated.

With these and other objects in view, my invention resides in the novel constructions, combinations and arrangements of parts to be hereinafter more fully described, claimed and illustrated in the accompanying drawing, in which, Figure 1 is a side elevation of my device; Fig. 2 is a bottom plan view thereof; Fig. 3 is a view similar to Fig. 2 with several of the parts removed; Fig. 4 is an inverted section on the line 4—4 of Fig. 2, with the disks removed; Fig. 5 is an elevation showing the discharge spout.

Referring more particularly to the drawings, the numeral 1 designates a tubular handle forming a reservoir for the seed, the opposite ends of the handle being closed by suitable caps 2, and the lower face of the handle being formed near the lower end thereof with a discharge opening 3. Secured to the opposite sides of the handle, adjacent the discharge opening therein, are a pair of stub shafts 4 upon which are adapted to be mounted the disk wheels 5. Each of the disks 5 are formed on their outer faces with an annular rib 6 which prevents the machine from sinking too deeply in the furrow. One of the stub shafts 4 is formed with a hollow bore 7 in which an axle 8 is adapted to rotate. The outer end of the axle 8 is angular which is adapted to engage the angular bore of one of the disks so that the axle 8 will be rotated upon rotation of the disks. Mounted upon the lower face of the handle, and arranged upon each side of the discharge opening 3, are a pair of guide members 9, the outstanding portions of which are bent to form channels 10 for the reception of the opposite longitudinal edges of a seed discharge regulator 11. The discharge regulator is formed of a rectangular strip of metal having a handle 12 secured to the inner end thereof and formed in the lower end of the regulator are a series of openings 13, the openings being of different diameters and adapted to register with the discharge opening 3 in the handle so as to regulate the quantity of seed delivered into the discharge spout 14. The bent portions 15 of the guide members 9 form longitudinally extending ribs with which the inwardly bent portions 16 of the discharge spout 14 are adapted to slidably and frictionally engage so that the spout 14 may be readily disposed below the discharge opening 3 in the handle or may be entirely removed from the handle. The discharge spout 14 is provided on its rear face with a suitable handle 17, and the rear wall of the spout is inclined forwardly as at 18 whereby the spout may be adjusted in the guide members 9 so that the seed will be discharged through the openings 13 in the discharge regulator 11 and so the seed will fall upon the inclined rear wall of the discharge spout 14 and be discharged into the furrow before the furrows are covered by the disks 5. It will be seen that the discharge spout 14 may move rearwardly in the guide members 9 so that the seed will drop directly through the opening in the spout without coming into contact with the inclined rear wall thereof whereby the seed are deposited in the furrow while they are being covered. It will be seen that by the adjustability and the construction of the discharge spout the seed may be deposited in the ground at different depths, according to the nature of the seed.

If desired, a longitudinal opening 19 may be formed in the upper face of the handle intermediate of its ends which is adapted to be closed by a rectangular closure plate 20 so that the amount of seed in the seeder may be determined while the machine is in operation.

From the above description, taken in connection with the accompanying drawing, it will be seen that I have provided a seeder which comprises a minimum number of parts and which may therefore be cheaply manufactured, and one in which the amount of seed to be deposited in the furrow can be regulated. It is also apparent, from the above description taken in connection with the accompanying drawing, that the depth to which the seed is deposited in the furrow can be regulated by merely adjusting the discharge spout 14 to the desired position. To prevent the outlet opening 3 in the handle from clogging, I provide a feeder which comprises a sleeve 21 which is mounted on the inner annular portion 22 of the shaft 8, the sleeve being provided with a plurality of radially projecting longitudinally extending arms 23. Each of the arms is provided with a longitudinal series of brushes 24 which are adapted to stir or agitate the seed adjacent the seed opening 3 in the handle.

While the construction illustrated in the accompanying drawing is the preferred embodiment of my invention, it is to be understood that minor changes in the construction may be resorted to without departing from the spirit of my invention or sacrificing any of its advantages as determined by the scope of the appended claims.

Having thus described my invention what I desire to claim and secure by Letters Patent is:

1. A device of the character described comprising a hollow handle having a discharge opening therein, a discharge regulating plate slidably connected to said handle under the discharge opening, and a discharge spout slidably connected to said handle and arranged below said discharge regulating plate, as and for the purpose described.

2. A device of the character described comprising a hollow handle having a discharge opening therein, longitudinally extending guide members arranged upon said handle at each side of said discharge opening, a discharge regulating plate slidably connected to said guide members, and a discharge spout slidably connected to said guide members and disposed below said regulating plate, as and for the purpose described.

3. A seeder comprising a hollow handle having a discharge opening near one end, longitudinally extending guide members arranged upon said handle at each side of said discharge opening, said guide members being bent to form channels, a discharge regulating plate slidably mounted in the channels in said guide members, and a discharge spout slidably connected to the bent portions of said guide members and disposed below said regulating plate, as and for the purpose described.

4. A device of the character described comprising a hollow handle having a discharge opening near one end, disks rotatably mounted upon said handle, a feeder mounted within said handle and operatively connected to one of said disks, a discharge regulating plate slidably connected to said handle under said discharge opening, and a discharge spout slidably connected to said handle and arranged below said discharge regulating plate, as and for the purpose described.

5. A seeder of the class described comprising a hollow handle having a discharge opening near one end, disks rotatably mounted upon said handle, a feeder mounted within said handle and operatively connected to one of said disks, guide members arranged upon said handle, a discharge regulating plate slidably connected to said guide members under said discharge opening, and a discharge spout slidably connected to said guide members and arranged below said discharge regulating plate, as and for the purpose described.

6. A device of the character described comprising a hollow handle having a discharge opening therein, a pair of oppositely extending stub shafts formed on said handle adjacent said discharge opening, one of said stub shafts having a hollow bore, an axle mounted in said hollow bore and extending within said handle, a feeder secured to said axle within said handle, disks mounted on said stub shafts, one of said disks being operatively connected to said axle, and a discharge regulating plate connected to said handle under said discharge opening, as and for the purpose described.

7. A seeder of the class described comprising a tubular handle having a discharge opening near one end, disks rotatably mounted upon said handle, a shaft connected to one of said disks and extending within said handle, a feeder mounted on said shaft within the handle, a discharge regulating plate connected to said handle under the discharge opening, and a discharge spout slidably connected to said handle and arranged below said discharge regulating plate.

8. A device of the character described comprising a tubular handle having a discharge opening therein, a feeder rotatably mounted in said handle adjacent said discharge opening, a discharge regulating plate slidably connected to said handle, said plate being formed with a plurality of openings, said openings being of relatively different diameters and adapted to register with the discharge opening in said handle, and a discharge spout slidably connected to said handle and disposed below said regulating plate.

In testimony whereof I hereunto affix my signature in the presence of two witnesses.

ELOF J. YOUNGBERG.

Witnesses:
D. D. PORTER,
J. B. OLINGER.